United States Patent [19]
Esman et al.

[11] Patent Number: 5,734,667
[45] Date of Patent: Mar. 31, 1998

[54] POLARIZATION-STABLE LASER

[75] Inventors: Ronald D. Esman, Burke; Irl N. Duling, III, Round Hill; James L. Dexter, Alexandria, all of Va.; David G. Cooper, Riva, Md.

[73] Assignee: The United States of America as represented by the Secretary of the Navy, Washington, D.C.

[21] Appl. No.: 430,946

[22] Filed: Apr. 28, 1995

[51] Int. Cl.$^6$ ........................................ H01S 3/10
[52] U.S. Cl. ...................... 372/27; 372/6; 372/106
[58] Field of Search .................. 372/27, 106, 6; 324/96

[56] References Cited

U.S. PATENT DOCUMENTS

| | | | |
|---|---|---|---|
| 4,814,524 | 3/1989 | Briody et al. | |
| 5,303,314 | 4/1994 | Duling, III et al. | 372/6 |
| 5,361,268 | 11/1994 | Fossey et al. | 372/27 |
| 5,434,501 | 7/1995 | Esman et al. | 324/96 |

FOREIGN PATENT DOCUMENTS

| | | |
|---|---|---|
| 0118241 | 9/1984 | European Pat. Off. |
| 0427603 | 5/1991 | European Pat. Off. |
| 857350 | 10/1952 | Germany |
| 2931777 | 2/1981 | Germany |
| 4225763 | 2/1994 | Germany |

OTHER PUBLICATIONS

Duling III et al., "Single–Polarisation Fibre Amplifier", Electronics Ltrs, 4 Jun. 1992, vol. 28, No. 12, pp. 1126–1127.

Giles, "Suppression of Polarisation Holeburning–Induced Gain Anisotropy In Reflective EDFAs" Electronics Ltrs, 9 Jun. 1994, vol. 30, No. 12, p. 976–977.

Esman et al., "Microwave True Time–Delay Modulator Using Fibre–Optic Dispersion", Electronics Ltrs, 24 Sep. 1992, vol. 28, No. 20, pp. 1905–1906.

Cowle et al., "Single–Frequency Travelling–Wave Erbium–Doped Fibre Loop Laser", Electronics Ltrs, 31 Jan. 1991, vol. 27, No. 3, pp. 229–230.

Schmuck et al., "Widely Tunable Narrow Linewidth Erbium Doped Fibre Ring Laser", Electronics Ltrs, 7 Nov. 1991, vol. 27, No. 23, pp. 2117–2119.

Iwatsuki et al., "Wavelength–Tunable Single–Frequency and Single–Polarisation Er Doped Fibre Ring–Laser With 1.4kHz Linewidth", Elec. Ltrs, 22 Nov. 1990, vol. 26, No. 24, pp. 2033–2035.

Primary Examiner—Leon Scott, Jr.
Attorney, Agent, or Firm—Thomas E. McDonnell

[57] ABSTRACT

An optical device includes a polarization section having a port, the polarization section being for receiving light at the port and for outputting light at the port with a state of polarization orthoconjugate to the light received at the port. The polarization section includes a reflector, a bidirectional nonreciprocal rotator and a bidirectional polarizer. The bidirectional nonreciprocal rotator has first and second ends, the first end being operatively coupled to the port. The bidirectional polarizer has first and second ends, the first polarizer end being operatively coupled to the reflector and the second polarizer end being operatively coupled to the second rotator end. The optical device further includes an amplifying section having a port and a rotator-reflector, the amplifying section being for receiving light at the amplifying section port and for outputting light at the amplifying section port with a state of polarization orthoconjugate to the light received at the amplifying section port and being amplified with respect thereto. The optical device includes means for transmitting light in both directions between the polarization section port and the amplifying section port, and means responsive to light internal to the polarization section for outputting coherent light having a stable and known state of polarization.

39 Claims, 6 Drawing Sheets

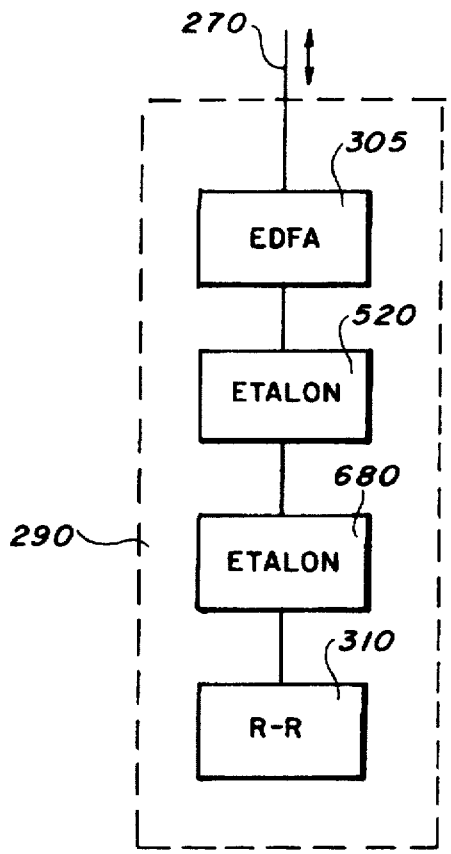
FIG. 5
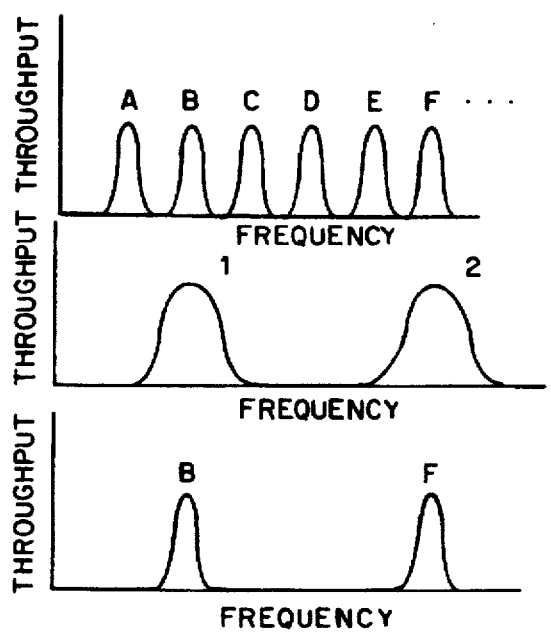
FIG. 6(A)
FIG. 6(B)
FIG. 6(C)
FIG. 6

POLARIZATION-STABLE LASER

FIELD OF THE INVENTION

This invention relates generally to coherent light generators, and more particularly to lasers for producing light having a stable polarization state.

BACKGROUND OF THE INVENTION

Solid state optical fiber amplifiers, such as erbium-doped material, have advantages as gain media for use in lasers. Such lasers provide a very narrow fundamental spectral width and can be very compact.

However, optical fibers have shortcomings due to fiber birefringence. Except for expensive polarization-maintaining or single-polarization fibers, optical fibers modify the state of polarization of light passing through them because of physical irregularity, thermal or mechanical stress, or other environmental factors. This birefringence is typically time-varying and unpredictable. As a result of such birefringence, fiber lasers, such as ring fiber lasers, are unstable in terms of frequency, polarization, amplitude, or power, unless they use extremely expensive and rare polarization-maintaining or single-polarization fibers. Fiber lasers are adversely affected by polarization-mode competition, polarization-mode dispersion, and polarization gain dependence and may manifest mode hopping and polarization instability. Furthermore, multiple pass fiber lasers producing standing waves are adversely affected by spatial mode burning resulting in mode hopping and mode instability.

U.S. Pat. No. 5,303,314 to Irl. N. Duling, III overcomes the above problems in providing a polarization-stable laser. However, that invention uses a 3-port direction-selective coupler, such as a 3-port polarization beam splitter. Such a coupler has inherent disadvantages in terms of cost and reliability.

SUMMARY OF THE INVENTION

It is an object of this invention to provide a laser for outputting coherent light having a stable and known state of polarization.

It is another object of this invention to provide a polarization-stable laser with a minimal number of longitudinal modes.

It is another object of this invention to provide a polarization-stable laser using an amplifying medium sensitive to thermal or mechanical stress.

It is a further object of this invention to provide a polarization-stable laser using an amplifying medium sensitive to thermal or mechanical stress and yet in which the laser is independent of environmental perturbations to the amplifying medium.

It is a still further object of this invention to provide a polarization-stable laser using a single mode amplifying fiber.

It is a still further object of this invention to provide a polarization-stable laser which does not have spatial hole burning.

The above objects can be accomplished by an optical device which includes a polarization section having a port, the polarization section being for receiving light at the port and for outputting light at the port with a state of polarization orthoconjugate to the light received at the port. The polarization section includes a reflector, a bidirectional nonreciprocal rotator and a bidirectional polarizer. The bidirectional nonreciprocal rotator has first and second ends, the first end being operatively coupled to the port. The bidirectional polarizer has first and second ends, the first polarizer end being operatively coupled to the reflector and the second polarizer end being operatively coupled to the second rotator end. The optical device further includes an amplifying section having a port and a rotator-reflector, the amplifying section being for receiving light at the amplifying section port and for outputting light at the amplifying section port with a state of polarization orthoconjugate to the light received at the amplifying section port and being amplified with respect thereto. The optical device includes means for transmitting light in both directions between the polarization section port and the amplifying section port, and means responsive to light internal to the polarization section for outputting coherent light having a stable and known state of polarization.

The laser cavity between the reflector in the polarization section and the rotator-reflector in the amplifying section can be short enough to reduce the longitudinal modes to a single mode. The bidirectional amplifier can be a medium sensitive to stress, such as a single mode fiber with gain.

These and other objects, features and advantages of the present invention are described in or apparent from the following detailed description of preferred embodiments.

BRIEF DESCRIPTION OF THE DRAWINGS

The preferred embodiments will be described with reference to the drawings, in which like elements have been denoted throughout by like reference numerals, and wherein:

FIG. 5 shows an amplifying section with two etalons.

FIG. 6, composed of FIGS. 6(A), 6(B), and 6(C) shows the frequency response of the amplifying section of FIG. 5 and, in particular, FIG. 6(A) shows the frequency response of etalon 520, FIG. 6(B) shows the frequency response of etalon 680, and FIG. 6(C) shows the frequency response of etalon 520 in series with etalon 680.

DETAILED DESCRIPTION OF THE PREFERRED EMBODIMENTS

Figure 1:
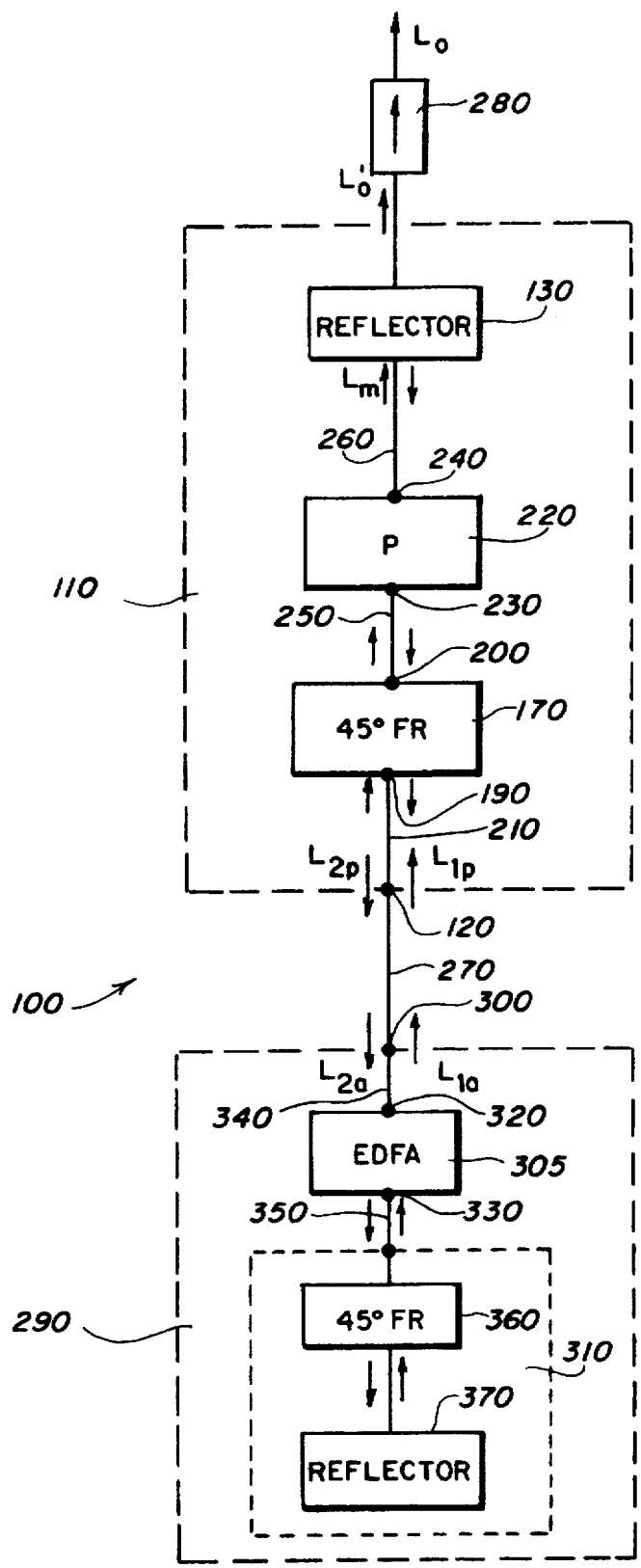
FIG. 1 shows an iota configuration of a laser.

Referring now to the drawings, FIG. 1 shows a fiber laser in an "iota" configuration 100. As discussed further below, the laser 100 could equally well include bulk optical components.

The iota laser 100 has a polarization section 110 which is preferably constructed of polarization-sensitive components and polarization-maintaining means for transmission. The polarization section 110 has a port 120 for receiving light $L_{1p}$ and for outputting light $L_{2p}$. The polarization section 110 is designed to output light $L_{2p}$ polarized orthogonal to the polarization of light $L_{1p}$ so that light $L_{1p}$ and $L_{2p}$ have orthoconjugate states of polarization. The polarization section 110 includes a reflector 130, which constitutes one end of the laser cavity of the iota laser 100. For purposes of this discussion, "polarization state" in the polarization section 110 refers to linearly polarized light, but the invention is not necessarily limited to linearly polarized light.

The polarization section 110 also includes a nonreciprocal rotator 170 for rotating the polarization state of light passing therethrough. Being bidirectional, the rotator 170 has two ports, 190 and 200. The polarization state of light passing from port 190 to port 200 is rotated by a polarization angle $\theta_{p1}$ and the polarization state of light passing from port 200 to port 190 is rotated by a polarization angle $\theta_{p2}$, each such rotation being with respect to the direction of light propagation. Since the rotator 170 is nonreciprocal, the polarization angles $\theta_{p1}$ and $\theta_{p2}$ are of opposite sign, i.e. $\theta_{p2}=-\theta_{p1}$. If the polarization state of light passing in one direction is rotated clockwise with respect to the direction of propagation, the polarization state of light passing in the opposite direction is rotated counterclockwise with respect to the direction of propagation. The rotator 170 is most preferably a 45° Faraday rotator, so $|\theta_{p1}|=45°$. An exemplary 45° Faraday rotator has a 0.28 dB insertion loss, at least 35 dB extinction ratio, and at least 65 dB return loss. The rotator 170 is operatively coupled to the polarization section port 120 by transmission means 210 for transmission of light in both directions between ports 190 and 120.

The polarization section 110 also includes a bidirectional polarizer 220. An exemplary polarizer 220 is a linear polarizer with 1 dB insertion loss. Being bidirectional, the polarizer 220 has two ports, 230 and 240. The polarizer 220 is operatively coupled to the rotator 170 by transmission means 250 for transmission of light in both directions between ports 230 and 200, and operatively coupled to the reflector 130 by transmission means 260 for transmission of light in both directions between port 240 and the reflector 130.

In the embodiment shown in FIG. 1, the port 190 of the rotator 170 is pigtailed with single mode fiber 270, thereby constituting port 120 of the polarization section 110. Port 190 can be the same as port 120, thereby constituting transmission means 210. The port 200 of rotator 170 is pigtailed with polarization-maintaining fiber 250 coupled with the polarizer 220, thereby constituting the port 230 of the polarizer 220. This polarization-maintaining fiber 250 is oriented so that one of the fiber axes is coincident with the polarizer 220.

Port 240 of the polarizer 220 preferably has a reflective coating, such as a 50% reflective coating. The reflective surface on port 240 constitutes the reflector 130 and transmission means 260.

Internal transmission in the polarization section 110, such as by transmission means 210, 250 and 260, is preferably provided by polarization-maintaining transmission means, and most preferably by lens optics (not shown) so that the polarization section 110 can be assembled by simple butting of the elements. Alternatively, internal transmission could be provided by polarization-maintaining fiber 210, 250 and 260.

A mechanism for providing output light $L_o$ includes the partially reflecting mirror 130. Part of the light $L_m$ incident on the reflector 130 is not reflected back to the polarizer 220 but rather passes through as light $L_o'$. A polarization-maintaining isolator 280 is operatively coupled to partially reflecting mirror 130 and responsive to light $L_o'$ for outputting light $L_o$. The isolator 280 minimizes any external feedback influence on the laser 100. Exemplary isolators 280 are discrete isolators and fiber optic isolators.

The above described embodiment of the polarization section 110 is not intended to limit the scope of the invention. The components need not be optical fiber components. For example, bulk components are satisfactory since bulk transmission, especially air, can be readily designed to maintain polarization. The polarizer 220 need not have any reflective coatings, and it is not necessarily a linear polarizer. The reflector 130 need not be a mirror nor need it be partially reflective, so long as an output mechanism is provided responsive to light internal to the polarization section 110. For example, the output mechanism could be responsive to light output from the reflector 130, from the polarizer 220 at ports 240 or 230, to light output from the rotator 170 at port 200 or 190, or to light $L_{1p}$ received at port 120.

The polarization section 110 is preferably fabricated as a single integrated unit. Such a design is advantageous in that it does not have any polarization-maintaining/polarization-maintaining optical fiber splices which would adversely affect ease of construction, performance, precision and price. A single unit design is more rugged, easier to build, and of lower cost than a design using separate components.

The iota laser 100 also includes an amplifying section 290 with a port 300 for receiving light $L_{2a}$ and outputting light $L_{1a}$. As discussed further below, the amplifying section 290 is designed to output light $L_{1a}$ having a state of polarization orthoconjugate to light $L_{2a}$ and amplified with respect thereto. Transmission means 270, for example, single mode fiber, is for transmitting light in both directions between the polarization section 110 and the amplifying section 290.

As discussed further below, the light $L_{1p}$ received by port 120 of the polarization section 110 is primarily orthoconjugate to the light $L_{2p}$ output by port 120 of the polarization section 110. For purposes of this discussion, the state of polarization will be discussed with reference to the orientation of the polarizer 220, and in particular, to the polarization of light propagating in the direction from the rotator 170 to the polarizer 220 and from the polarizer 220 to the reflector 130. Such reference polarization direction will be considered 0°, and determines the orientation of the polarization state of output light $L_o$. It will also be assumed, without loss of generality, that the rotator 170 is a 45° Faraday rotator for rotating the polarization state of light received by the rotator 170 at port 190 by +45° with respect to the direction of propagation. Using the representation defined above, $\theta_{P1}=+45°$ and $\theta_{P2}=-45°$.

For that component of light $L_{1p}$ received at port 120 of the polarization section 110 having a linear polarization oriented at −45°, the 45° Faraday rotator 170 will output light at port 200 having a polarization orientation of 0°. This light transmitted to the polarizer 220 and received by the polarizer 220 at port 230 passes through the polarizer 220 and is output at port 240 without any change in polarization state. Any component of light $L_{1p}$ received at port 120 which has a state of polarization different from −45° will be blocked by the polarizer 220 after the light's polarization state is rotated +45° by the rotator 170. The light with polarization state of 0° after being rotated by the rotator 170 and passing through the polarizer 220 is then transmitted to the reflector 130 as light $L_m$. Part of it is output as light $L_o'$, being coherent and having a stable polarization state with known orientation of 0°.

At least part of the light $L_m$ received at the reflector 130 is reflected and returned to port 240 of the polarizer 220. Only light with a polarization state of 0° passes through the polarizer 220 and is output at port 230. It is then transmitted to the rotator 170 and rotated by −45° so that the light $L_{2p}$ output at port 120 of the polarization section has a polarization state of −45°. Since light $L_{1p}$ and $L_{2p}$ are propagating in opposite directions, light $L_{2p}$, having polarization state of −45°, is orthoconjugate to that component of light $L_{1p}$ having a polarization state of −45°. Since, as shown below, the light $L_{1p}$ received by port 120 of the polarization section 110 is primarily orthoconjugate to the light $L_{2p}$ output by port 120 of the polarization section 110, therefore light $L_{1p}$ is predominantly orientated at −45°.

If transmission means 210, 250 or 260 is provided by polarization-maintaining fiber, the fiber is preferably oriented so that for each direction of travel, light is transmitted through it primarily on an axis, and is not transmitted primarily off-axis. As already discussed, polarization-maintaining fiber 250 is preferably oriented so that one of the fiber axes is coincident with the polarizer 220. Fiber 250 is preferably so aligned since the light transmitted in both directions on fiber 250 has 0° polarization state. For the same reasons, polarization-maintaining fiber 260 is also preferably oriented so that one of the fiber axes is coincident with the polarizer 220 since the light transmitted in both directions on fiber 260 has 0° polarization state. If transmission means 210 is polarization-maintaining fiber, it is preferably oriented with axes at ±45° with respect to the polarizer 220, since the light transmitted through it in both directions has ±45° polarization state.

The above analysis applies equally well to other orientations of the polarizer 220 and to a rotator which rotates the polarization state by −45°, that is, $\theta_{p1}=-45°$. In any event, the output light $L_o$ has known polarization state, oriented the same as the direction of polarization of the polarizer 220.

If the output light $L_o$ is based on light internal to the polarization section 110 but propagating other than at the reflector 130, then the above analysis applies equally well, but output light $L_o$ would have a stable and known state of polarization differing from the direction of polarization of the polarizer 220 by a known and readily determined amount. For example, if as discussed more fully with respect to the chi configuration, the output light $L_0$ is responsive to light $L_{1p}$ entering the polarization section, then it will have a polarization state rotated −45° with respect to the direction of polarization of the polarizer 220.

The amplifying section 290 includes a bidirectional amplifier 305 and a rotator-reflector 310, the latter being for returning light with orthoconjugate polarization to the state of polarization of light input to it. The rotator-reflector 310 constitutes the other end of the laser cavity from the reflector 130. Being bidirectional, the amplifier has two ports, 320 and 330. The amplifier 305 is operatively coupled to the amplifying section port 300 by transmittal means 340 for transmittal of light in both directions between ports 300 and 320, and operatively coupled to the rotator-reflector 310 by transmittal means 350 for transmittal of light in both directions between port 350 and the rotator-reflector 310. Transmission in the amplifying section 290, such as by transmission means 340 and 350, is preferably provided by single mode transmission means, such as single mode fiber. As with the polarization section 110, the components of amplifying section 290 need not be optical fiber components, and transmission need not be by optical fiber. However, the invention is designed to address problems inherent in bidirectional amplifying media sensitive to environmental stress, as single mode polarization fiber with gain is.

An exemplary amplifier 305 is an erbium doped fiber amplifier pumped by a 1480 nanometer (nm) diode laser (not shown). The fiber amplifier can alternatively be doped with any ion, such as neodymium, holmium, and thulium.

An embodiment of such an amplifying section is described in U.S. Pat. No. 5,303,314 to Duling, which patent is incorporated herein by reference. In such an embodiment, the rotator-reflector 310 includes a 45° Faraday rotator 360 in series with a reflector 370. The rotator-reflector 310 can be implemented as a single unit conventional Faraday rotator and mirror combination 310.

Conventional optical fibers, such as the single mode fibers preferably used in transmission means 270, 340 and 350 and in amplifier 305, exhibit reciprocal birefringence. Because of this property, light propagating in opposite directions with orthoconjugate polarization states remain in orthoconjugate polarization states with respect to each other regardless of slow variations in the fiber birefringence. Variations in the fiber birefringence are preferably on a time scale slower than the round trip time through the transmission means 270 and the amplifying section 290.

As discussed above, light $L_{2p}$ output at port 120 of the polarization section 110 has a polarization state of −45°. As a specific example for linearly polarized light throughout the laser 100, the light propagates through transmission means 270 and 340 and as it so propagates, its polarization state evolves so that light reaches the amplifier 305 with polarization state $-45°-\Delta\theta_{a1}$. It is amplified as it passes through the amplifier 305 and output at port 330 with polarization state $-45°-\Delta\theta_{a1}-\Delta\theta_{a2}$. As the light propagates through transmission means 350, the polarization state further evolves so that light reaches the rotator-reflector 310 with polarization state $-45°-\Delta\theta_{a1}-\Delta\theta_{a2}-\Delta\theta_{a3}$. Without loss of generality, it is assumed that the light is returned from the rotator-reflector 310 in the opposite direction with polarization state $-45°+\Delta\theta_{a1}+\Delta\theta_{a2}+\Delta\theta_{a3}$. A similar analysis would apply to a rotator-reflector 310 returning light in the opposite direction with polarization state $+45°+\Delta\theta_{a1}+\Delta\theta_{a2}+\Delta\theta_{a3}$. For the former situation, the light from the rotator-reflector 310 propagates through transmission means 350 and reaches port 330 of the amplifier 305 with polarization state $-45°+\Delta\theta_{a1}+\Delta\theta_{a2}$. Because of reciprocal birefringence, the polarization change has "unwound" so that the light reaches port 330 with polarization state orthoconjugate to the state it left port 330 with. The light is again amplified as it passes through the amplifier 305 and its polarization state "unwinds" so it leaves port 320 with polarization state $-45°+\Delta\theta_{a1}$. As the light propagates through transmission means 270 back to port 120 of the polarization section 110, its polarization state further "unwinds", so it returns to port 120 of the polarization section 110 as light $L_{1p}$ with polarization state −45°, orthoconjugate to light $L_{2p}$ output at port 120. At all locations on transmission means 270 and in the amplifying section 290, including port 300, the light is propagated in opposite directions with orthoconjugate polarization states. This simplified analysis applies equally well to arbitrary elliptically polarized light.

Therefore, transmission difficulties such as interfering modes and other distortions resulting from birefringence are substantially reduced or eliminated. Moreover, the need for other conventional polarization treatment devices in the optical signal path (such as polarization controllers) are eliminated. The fiber optic amplifier 305 may be straightforwardly constructed of readily obtained non-polarization-maintaining fiber, reducing cost and complexity.

The above analysis applies equally well to transmission means 270, 340 and 350 being polarization-maintaining means, such as polarization-maintaining fiber or bulk transmission.

The above-described iota laser 100 is a traveling wave double pass linear laser for producing light with stable and known polarization state. It does not use a polarization beam splitter and so has a cheaper, more rugged design which is easier to use. It uses very few components and thus has reduced cost and cavity length, which are advantageous features for single-frequency lasers. It does not require the use of any polarization-maintaining fiber coupler or polarization-maintaining/polarization-maintaining optical fiber splices, either of which would have adverse effects. Because of its double pass linear design, it efficiently extracts single mode fiber amplifier energy but, because light passing in opposite directions has orthoconjugate polarization state, it does not introduce spatial hole burning, polarization-mode competition, or polarization gain dependence. It is not subject to polarization instability.

Figure 2:
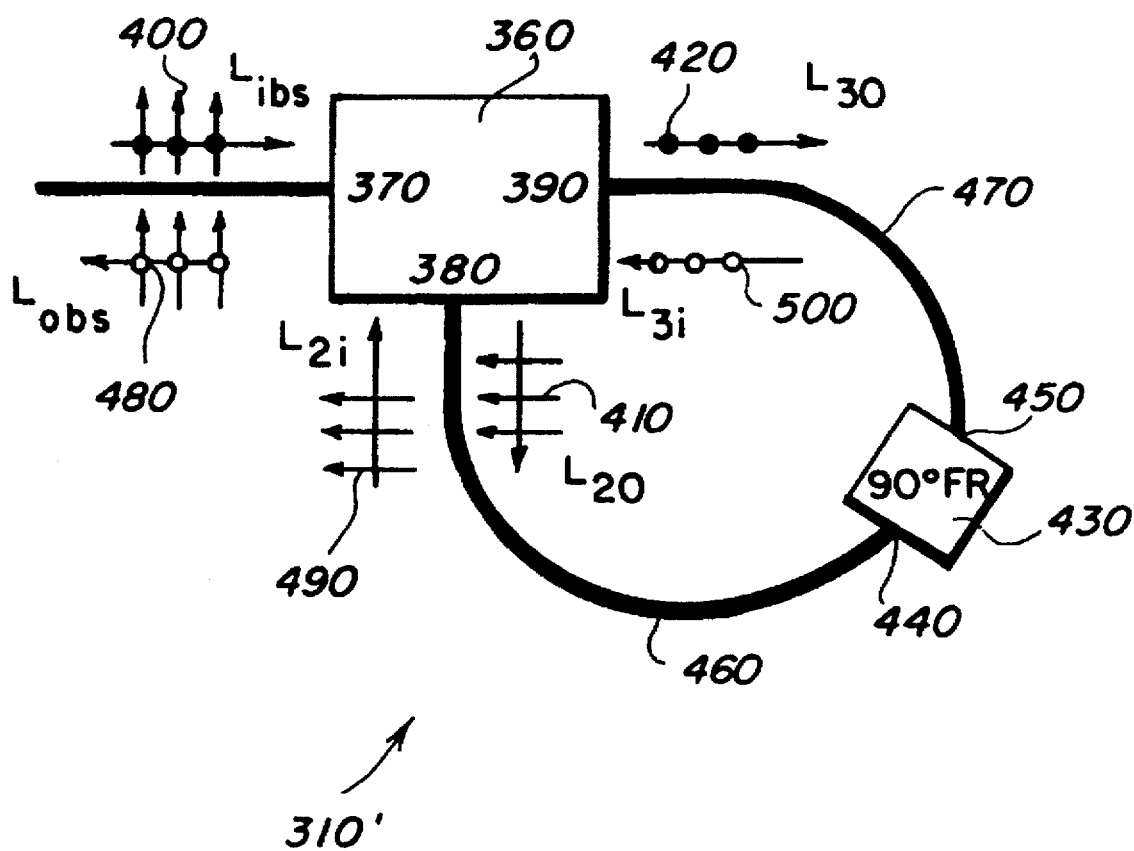
FIG. 2 shows a rotator reflector using a beamsplitter.

Referring now to FIG. 2, an alternate design for the rotator-reflector 310' uses a beamsplitter 360, preferably a polarization beamsplitter, having at least ports 370, 380 and 390. The beamsplitter 360 is preferably a polarization beamsplitter, such as fiber optic splitter/combiner model FOBS-22P-1111-SSPP-1300-PBS-45 from OZ Optics Ltd., Corp. The beamsplitter 360 could also be of any type known to persons skilled in the art, such as bulk or fused fibers, so long as it has the properties set forth below.

The beamsplitter 360 is responsive to light $L_{ibs}$ selectively applied to port 370 and to light selectively applied to ports 380 and 390 as described below. The light $L_{ibs}$ need not have any particular state of polarization 400 as it reaches the port 370. The polarization state 400 of the light $L_{ibs}$ as it reaches the beamsplitter 360 shown at any particular instant may be arbitrary. It can vary unpredictably over time. The rotator-reflector 310' is insensitive to the polarization state 400.

The beamsplitter 360 passes that component of the light $L_{ibs}$ applied to the port 370 having a first polarization state, for example, vertical linear polarization, to the port 380. The beamsplitter 360 passes that component of the light $L_{ibs}$ applied to the port 370 having a second polarization state, for example, horizontal linear polarization, to the port 390. The first and second states are orthogonal but otherwise arbitrary.

The light $L_{2o}$ which the beamsplitter 360 passes from the port 370 to the port 380 has polarization state 410, and the light $L_{3o}$ which the beamsplitter 360 passes from the port 370 to the port 390 has polarization state 420.

The rotator-reflector 310' further includes a bidirectional nonreciprocal rotator, preferably a 90° Faraday rotator 430 having ports 440 and 450, and transmission means 460 and 470 for propagating light in both directions between ports 380 and 460, and for propagating light in both directions between ports 420 and 470, respectively. Transmission means 460 and 470 are preferably polarization-maintaining means, such a polarization-maintaining fiber, and are preferably oriented so the light primarily propagates on the fiber axes, and not off-axis.

The beamsplitter 360 passes that component of the light $L_{2i}$ applied to the port 380 which has the first polarization state to the port 370. The beamsplitter 360 also passes that component of the light $L_{3i}$ applied to the port 390 which has the second polarization state to the port 370. The light the beamsplitter 360 passes to the port 370 is the light $L_{obs}$ and has polarization state 480. It is a combination of the light $L_{2i}$ applied to the port 380 having the first polarization state and the light $L_{3i}$ applied to the port 390 having the second polarization state. The polarization state 480 of light $L_{obs}$ is influenced by the relative amplitude and phase of light $L_{2i}$ and $L_{3i}$ applied to ports 380 and 390, respectively, and is orthoconjugate to the polarization state 400 of light $L_{ibs}$ applied to the port 370 of the beamsplitter 310'. For linear input polarization state 400, the output polarization state 480 is the polarization state 400 rotated by ±90° and propagates in the opposite direction, so polarization states 400 and 480 are orthoconjugate. For example, if the polarization state 400 is linear vertical, then the polarization state 480 will be linear horizontal. The rotator-reflector 310' returns orthoconjugate light $L_{obs}$ for any arbitrary input polarization state 400.

Figure 3:
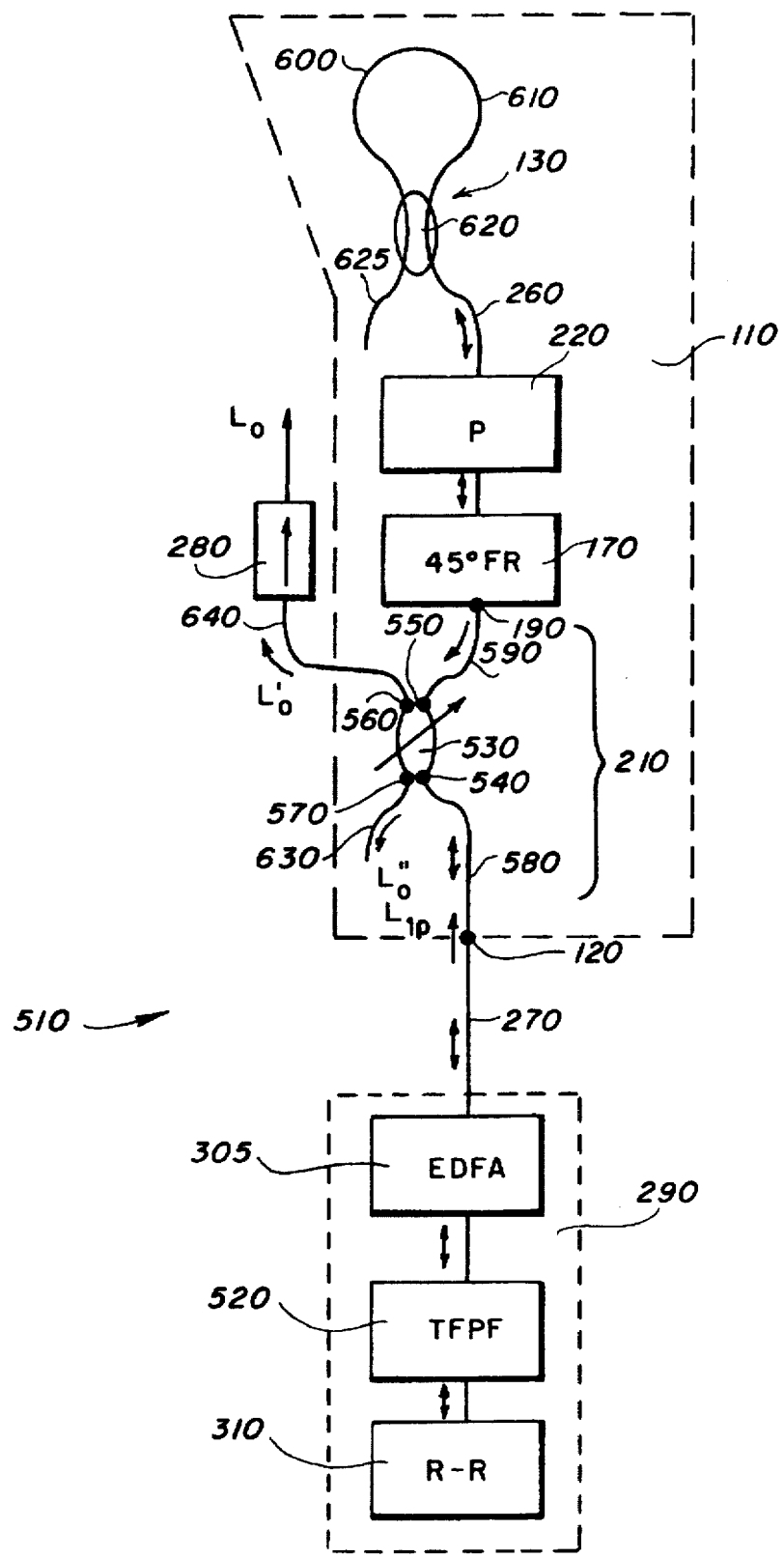
FIG. 3 shows a chi configuration of a laser.

Turning now to FIG. 3, a fiber laser in a "chi" configuration 510 is shown. This chi laser 510 preferably includes a wavelength tuning element 520, also called an etalon, operatively coupled between the amplifier 305 and the rotator-reflector 310 in the amplifying section 290. This wavelength tuning element 520, which is also preferably used in the iota configuration 100 (not shown in FIG. 1), provides narrow-band, rapidly tunable operation of the laser 510. An exemplary wavelength tuning element 520 is a commercially available piezo-tunable, Fabry-Perot filter with low back reflection, a free spectral range of 73 nm, a finesse of 200, and a maximum tuning rate of 1 kHz.

The polarization section 110 of the chi laser 510 includes a polarization-maintaining output coupler 530 having ports 540, 550, 560 and 570. An exemplary coupler 530 is a polished block, polarization-maintaining variable coupler with a 1 dB insertion loss. Port 540 of the coupler 530 is operatively coupled to port 120 of the polarization section 110, preferably by a polarization-maintaining fiber 580 for transmission of light in both directions between ports 540 and 120. Alternatively, port 540 could be the same as port 120 and could constitute polarization-maintaining transmission means 580.

Part of the light entering port 540 of the coupler 530 is output at port 550, and remains in the laser cavity. It is processed as in the iota laser 100 (FIG. 1). It is transmitted by a polarization-maintaining fiber 590 to the 45° Faraday rotator 170 which rotates it 45°. It is polarized by the polarizer 220, and reflected by the reflector 130. As shown, the reflector 130 can be a fiber loop mirror 130 made by splicing together two appropriate polarization-maintaining fibers 600 and 610 of a fixed 50% polarization-maintaining coupler 620 having 0.34 dB excess loss, and by terminating the other port 625. Polarization-maintaining fibers 600 and 610 are spliced together with their polarization axes (0°) aligned to each other. Such a fiber loop mirror 130 has nearly total reflection. The mirror 130 is preferably operatively coupled to polarizer 220 by polarization-maintaining fiber 260 for propagating light in both directions between the coupler 620 and the polarizer 220. Polarization-maintaining fiber 260 is preferably oriented so that one of the fiber axes is coincident with the polarizer 220 since the light transmitted in both directions on fiber 260 has 0° polarization state.

After reflection by the mirror 130, the light again passes through the polarizer 220 and the rotator 170 so that it is incident on port 550 on the orthogonal fiber axis to the above-described light output from port 550. On the return pass through the coupler 530, part of the light is unavoidably coupled via port 570 out of the polarization section 110 and out of the laser cavity. This light from port 570 can be used to monitor power and wavelength or it can constitute output light $L_o''$. However, the fiber 630 operatively coupled to port 570 is preferably optically terminated, angle-cleaved, or spliced to an isolator (not shown) to prevent destabilizing reflection into the laser cavity. The remaining light incident on port 550 feeds back to the amplifying section 290 by way of port 540, polarization-maintaining fiber 580, and fiber 270.

Another part of the light entering port 540 is output via port 560 as light $L_o'$, and by way of an optical isolator 280 provides output $L_o$ of the laser 510. The isolator 280 is operatively coupled to the port 560 of the coupler 530 by a polarization-maintaining fiber 640. Thus, an output mechanism is provided responsive to light internal to the polarization section 110 and, in particular, to light $L_{1p}$ received at port 120. Just as in the iota configuration shown in FIG. 1, the isolator 280 minimizes external feedback influence on the chi laser 510. An exemplary isolator 280 is a polarization-maintaining isolator with 1 dB insertion loss, at least 60 dB return loss, and at least 75 dB isolation.

As an alternate output mechanism, light output from port 570 via fiber 630 could constitute the output light $L_o'$. For this configuration, fiber 630 is preferably polarization-maintaining fiber, and the light $L_o'$ is preferably output via an isolator (not shown) operatively coupled to fiber 630, and the fiber 640 operatively coupled to port 560 should be optically terminated,, angle-cleaved, or spliced to an isolator 280 to prevent destabilizing back reflection into the laser cavity. The described output mechanism is responsive to light from the rotator 170 output at port 190.

As with the iota configuration (FIG. 1), if polarization-maintaining fiber is used to transmit light internal to the polarization section 100, the polarization-maintaining fiber is preferably oriented so the light is primarily propagated on one or both of the polarization-maintaining fiber axes. Therefore, if transmission means 580 and 590 are polarization-maintaining fibers, their axes are preferably oriented ±45° with respect to the polarizer 220.

Referring now to FIGS. 1 and 3, the chi configuration 510 differs from the iota configuration 100 primarily in the output mechanism used. In the iota configuration 100 (FIG. 1), the reflector 130 is partially reflecting, and part of the light $L_m$ incident on the reflector 130 is not reflected back to the polarizer 220 but rather passes through the reflector 130 as output light $L_o'$. The output mechanism is responsive to light $L_m$ incident on the reflector 130 and is responsive to light output at port 240 of the polarizer 220. In the chi configuration 510 (FIG. 3), the reflector 130 is fully reflecting but the output mechanism includes a coupler 530. The coupler 530 is part of the means 210 for transmitting light in both directions between the rotator 170 and the port 120, and the coupler 530 is responsive to light $L_{1p}$ received at port 120, and to light output from the rotator 170 at port 190, to provide output light from port 560 and/or 570, respectively.

Figure 4:
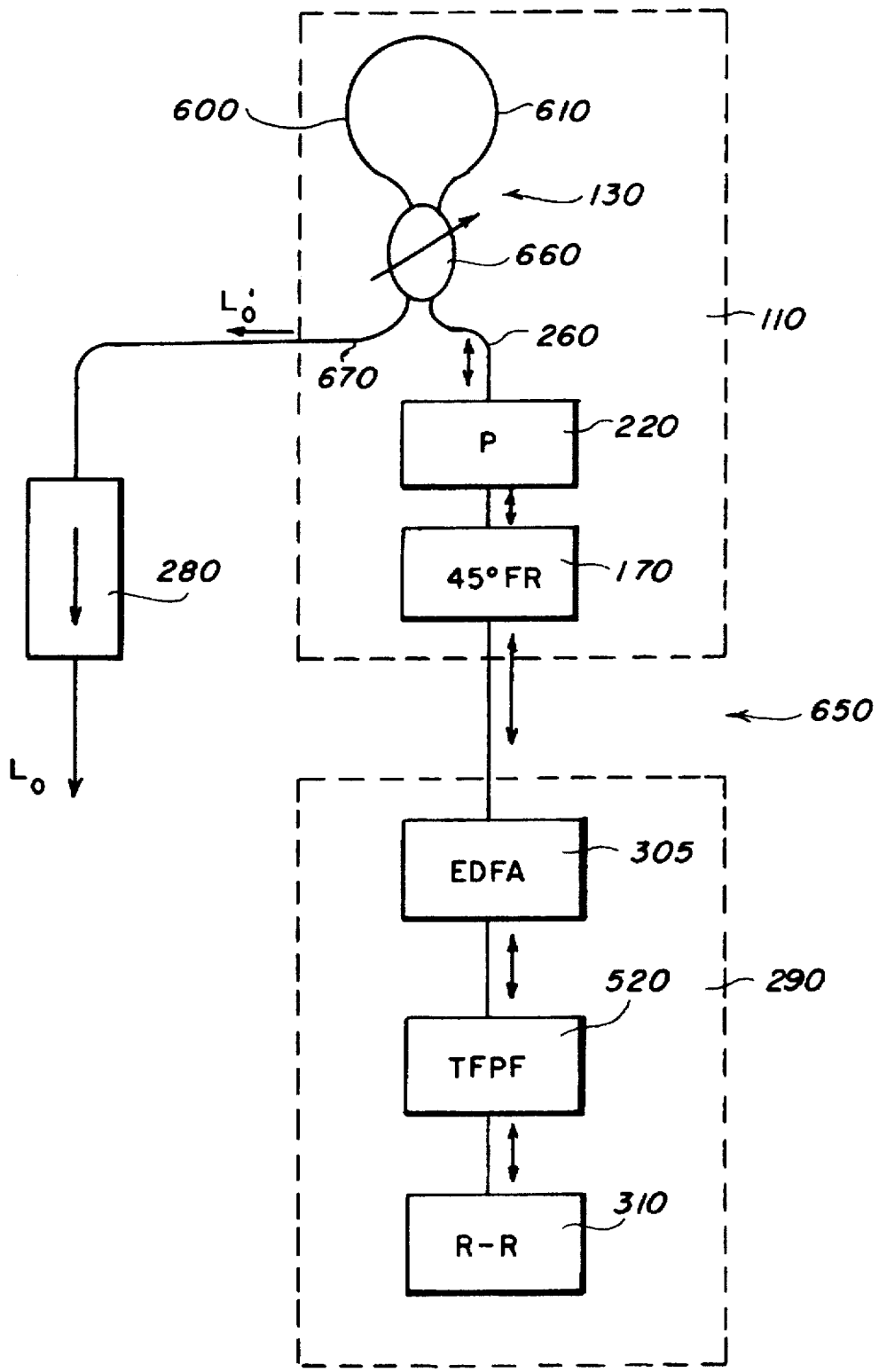
FIG. 4 shows an alpha configuration of a laser.

Referring now to FIG. 4, a fiber laser in an "alpha" configuration 650 is shown. The amplifying section 290, as in the chi configuration 510 of FIG. 3, includes a linearly coupled erbium doped fiber amplifier 305, etalon 520, and rotator-reflector 310. The polarization section 110, as in the iota configuration 100 of FIG. 1, includes the 45° Faraday rotator 170 linearly coupled with the polarizer 220. The reflector 130, as in the chi configuration 510 of FIG. 3, is a fiber loop mirror 130. It is preferably a variable-reflecting polarization-maintaining fiber loop mirror utilizing a polarization-maintaining variable coupler 660 having polarization-maintaining arms 260, 600, 610 and 670. The arm 260 provides transmission in both directions between the mirror 130 and the polarizer 220. Polarization-maintaining arms 600 and 610 are spliced together with axes aligned (0°) to each other. Arm 670 provides output light $L_o'$, which is preferably transmitted to an isolator 280 for providing laser output light $L_o$.

Referring to FIGS. 3 and 4, utilizing variable polarization-maintaining couplers 530 and 660 provides flexibility in adjusting and varying the amount of feedback in the chi and alpha lasers 510 and 650, respectively. Variable polarization-maintaining couplers 530 and 660 can be adjusted to optimize selected parameters. The coupling ratio of couplers 530 and 660 can be adjusted to provide optimal output. For example, in an experiment, the chi laser 510 provided maximum signal to noise ratio at 1550 nm with reflected coupling ratio of at least 75/25, and maximum output power at 1560 nm with coupling ratio of 90/10. The alpha laser 650 provided maximum signal to noise ratio at 1550 nm with reflected coupling ratio of at least 60/40, and maximum output power at 1550 nm with coupling ratio of 98/2. Referring back to FIG. 1, in the iota configuration 100, the percentage reflection of the reflector 130 can be adjusted to affect feedback, comparable to adjustment of the variable polarization-maintaining couplers 530 and 660 of the chi and alpha configurations 510 and 650, respectively.

Theoretical discussion of the iota configuration 100 (FIG. 1), chi configuration 510 (FIG. 3), and alpha configuration 650 (FIG. 4) can be found in Cooper et al., "Widely Tunable Polarization-Stable Fiber Lasers," IEEE Jnl. of Selected Topics in Quantum Electronics," vol. 1, No. 1, pp. 14–21, which article is incorporated herein by reference.

Referring now to FIGS. 1, 3 and 4, the cavity length between reflector 130 and rotator-reflector 310 is preferably made relatively short to reduce the number of longitudinal modes of operation. The iota configuration 100 has the greatest potential for single mode operation. If the amplifier 305 is a highly doped erbium waveguide amplifier 305, an iota laser 100 could be constructed with a cavity length of 50 centimeters (cm) or even shorter. The number of longitudinal modes decreases with increased feedback, and can be reduced to single mode operation. The number of longitudinal modes can also be further reduced by using a Fox-Smith cavity (not shown).

Referring now to FIG. 5, an amplifying section 290 is shown which further reduces the number of longitudinal modes by using a second etalon 680 in series with the first etalon 520 between the amplifier 305 and the rotator-reflector 310. Referring now to FIG. 6, which is composed of FIGS. 6(A), 6(B), and 6(C), the frequency response is shown. Referring now to FIG. 6(A), etalon 520 passes light of frequencies A, B, C, D, E and F. Referring now to FIG. 6(B), etalon 680 passes light of frequencies 1 and 2. Referring now to FIG. 6(C), etalon 520 in series with etalon 680 passes light of frequencies that would pass through both etalon 520 and etalon 680, in this case, B and F. If frequency B is within the gain region of amplifier 305, and frequency F is not, then the laser 100, 510 or 650 using amplifying section 290, produces light of frequency B.

Figure 7:
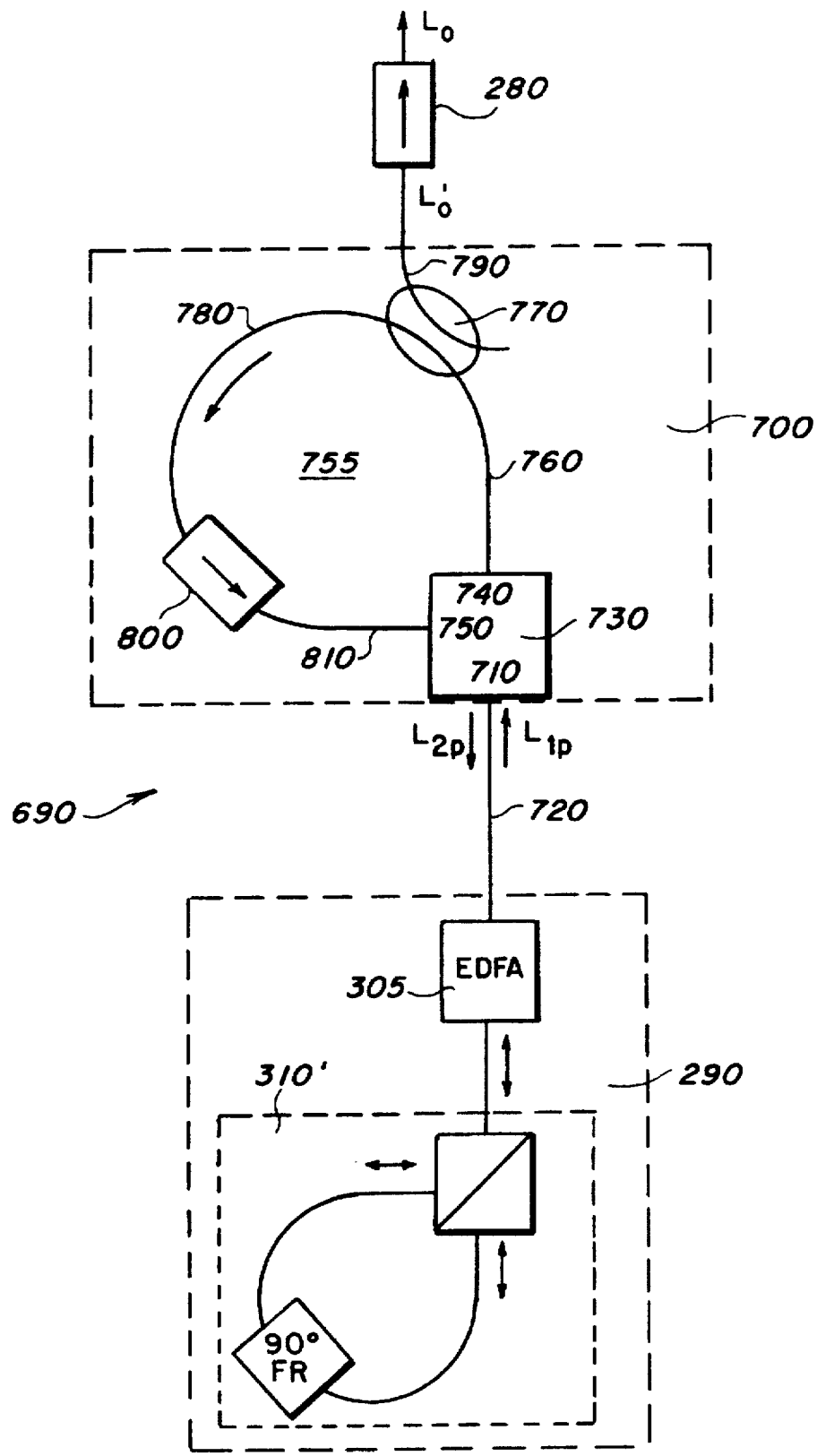
FIG. 7 shows a sigma configuration of a laser.

Referring now to FIG. 7, an amplifying section 290 using the rotator-reflector 310' of FIG. 2 may be used in other optical devices besides the iota configuration 100 (FIG. 1), chi configuration 510 (FIG. 3), and alpha configuration 650 (FIG. 4). It may be used as the optical amplifier discussed in U.S. Pat. No. 5,303,314 to Duling, and may be used in the "sigma" configuration 690.

The amplifying section 290 of the sigma laser 690 includes an amplifier 305 operatively coupled to the rotator-reflector 310' and may include a wavelength tuning element (not shown) as discussed above.

The sigma laser 690 has a polarization section 700 which is preferably constructed of polarization-sensitive components and polarization-maintaining means for transmission. The polarization section 700 has a port 710 for receiving light $L_{1p}$ and for outputting light $L_{2p}$. For purposes of this discussion, "polarization state" in the polarization section 700 refers to linearly polarized light, but the invention is not necessarily limited to linearly polarized light. The polarization section 700 is designed to output light $L_{2p}$ polarized orthogonal to the polarization of light $L_{1p}$ so that light $L_{1p}$ and $L_{2p}$ have orthoconjugate states of polarization.

The sigma laser 690 further includes transmission means 720, preferably single-mode fiber, for transmitting light in both directions between a polarization section 700 and the amplifying section 290.

The polarization section 700 of the sigma configuration 690 includes a beamsplitter 730, preferably a linear polarization beamsplitter, having at least ports 710, 740 and 750. the port 710 of the beamsplitter 730 is used as the port 710 of the polarization section 700, but the two ports could be distinct parts of the polarization section 700, in which case polarization-maintaining transmission means would be used to transmit light in both directions between the port 710 of the polarization section 700 and the port of the beamsplitter 730.

The polarization section 700 further includes a unidirectional ring 755 for unidirectional transmission of light from port 740 to port 750 so that light transmitted from port 740 and light transmitted to port 750 by the ring 755 have orthogonal polarization states.

Port 740 is a polarization-maintaining port coupled by polarization-maintaining fiber 760 to a polarization-maintaining coupler 770 having at least polarization-maintaining arms 760, 780 and 790, arm 760 being for input of light to the coupler 770, and arms 780 and 790 being for output of light from the coupler 770 responsive to light input at arm 760. The light output from the beamsplitter 730 at port 740, transmitted by fiber 760 to the coupler 770, and passed from the coupler 770 to the arm 790 has the same polarization state as the light $L_{1p}$ input to the beamsplitter 730 at port 710. The light output from the coupler 770 at port 790 constitutes the output $L_o'$ of the laser 790 and is preferably coupled to an isolator 280 for outputting light $L_o$ with a definite and known stable polarization state, and for reducing external feedback.

The polarization section 700 also includes an isolator 800 to receive light from fiber 780 and pass light to polarization-maintaining fiber 810, which transmits light to port 750 of the beamsplitter 730. The fiber 810 is coupled to the isolator 800 and port 750 of the beamsplitter 730 in such a manner that the light input to the isolator 800 by fiber 780 and the light input to the beamsplitter 730 by fiber 810 have orthogonal polarization state. The fiber 810 could have a 90° twist in it, or it could include a 90° polarization-maintaining/polarization-maintaining splice. Therefore, the light received at port 750 from fiber 810 has orthogonal polarization state with respect to the light passed from port 740 to fiber 760, which in turn has the same polarization state as the light $L_{1p}$ received at port 710. The former light is output at port 710 as light $L_{2p}$, and has orthoconjugate polarization state to light $L_{1p}$ received at port 710.

Light output from port 750 of the beamsplitter 730 has polarization state orthogonal to the polarization state of light $L_{1p}$ input to port 710. The former light is blocked by the isolator. Accordingly, the ring 755 is for unidirectional transmission of light from port 740 to port 750 so that light transmitted from port 740 and light transmitted to port 750 by the ring 755 have orthogonal polarization states. Port 740 is an output port of the beamsplitter 730, fiber 760 provides input to the coupler 770, and fibers 780 and 790 are for output from the coupler 770. The isolator 800 is operatively coupled to the coupler 770 for output from the coupler 770 and input to the isolator 800, and the isolator 800 is operatively coupled to port 750 for output from the isolator 800 and input to the port 750. Since the ring 755 provides unidirectional transmission of light, it avoids spatial mode burning.

The sigma configuration 690 differs from the iota configuration 100 (FIG. 1), chi configuration 510 (FIG. 3), and alpha configuration 650 (FIG. 4) in that the polarization section 700 of the sigma configuration does not necessarily include a 2-port bidirectional polarizer. Furthermore, the ring 755 is one end of the laser cavity, and the rotator-reflector 310' is the other end of the laser cavity.

The polarization section 700 may be varied as known to persons of ordinary skill in the art so as to accomplish the above objectives. The coupler 770 and isolator 800 may be in the opposite order, and the 90° twist may be in other places, such as fibers 760 and 780, so long as the coupler 770 and isolator 800 are serially coupled and so long as the ring 755 serves to receive light of the same polarization state as light $L_{1p}$ from port 740 and output light with orthogonal polarization state to port 750. A wavelength tuning element (not shown) may be included in the ring 755.

The foregoing descriptions of the preferred embodiments are intended to be illustrative and not limiting. It will be appreciated that numerous modifications and variations can be made without departing from the spirit or scope of the present invention.

What is claimed is:

1. An optical device comprising:

(a) a polarization section having a port, said polarization section being for receiving light at said port and for outputting light at said port having a state of polarization orthoconjugate to the light received at said port, said polarization section comprising a reflector, a bidirectional nonreciprocal rotator having first and second ends, said first end being operatively coupled to said port, and a bidirectional polarizer having first and second ends, said first polarizer end being operatively coupled to said reflector and said second polarizer end being operatively coupled to said second rotator end;

(b) an amplifying section having a port and a rotator-reflector, said amplifying section being for receiving light at said amplifying section port and for outputting light at said amplifying section port having a state of polarization orthoconjugate to the light received at said amplifying section port and being amplified with respect thereto;

(c) means for transmitting light in both directions between said polarization section port and said amplifying section port; and (d) means responsive to light internal to said polarization section (a) for outputting coherent light having a stable and known state of polarization.

2. The optical device of claim 1, further comprising:

first polarization-maintaining means for transmitting light in both directions between said rotator and said polarizer; and second polarization-maintaining means for transmitting light in both directions between said rotator and said reflector.

3. The optical device of claim 2, each of said first and second polarization-maintaining means for transmitting light comprising lens optics.

4. The optical device of claim 2, further comprising third polarization-maintaining means for transmitting light in both directions between said polarization section port and said rotator, each of said first, second and third polarization-maintaining means for transmitting light comprising polarization-maintaining fiber.

5. The optical device of claim 1, said reflector comprising a polarization-maintaining fiber loop mirror.

6. The optical device of claim 5, said fiber loop mirror comprising a coupler having first, second, third and fourth ports, said first, second and third ports being for input of light, said second and third ports being for output of light responsive to light received at said first port, said first port being for output of light responsive to light received at said second port, said first port being operatively coupled to said polarizer, and said second and third ports being mutually operatively coupled.

7. The optical device of claim 1, said amplifying section further comprising a bidirectional amplifier operatively coupled to said amplifying section port at a first end and operatively coupled to the rotator-reflector at a second end.

8. The optical device of claim 7, further comprising a bidirectional wavelength tuning element operatively coupled to said second end of said amplifier and to said rotator-reflector for filtering light output by said amplifier for input to said rotator-reflector, and for filtering light output by said rotator-reflector for input to said amplifier.

9. The optical device of claim 8, said wavelength tuning element comprising a piezo-tunable, Fabry-Perot filter.

10. The optical device of claim 7, said amplifier comprising a fiber optic amplifier.

11. The optical device of claim 10, said amplifier comprising a fiber doped with material selected from the group consisting of erbium, neodymium, holmium, and thulium.

12. The optical device of claim 10, further comprising:
a first single-mode fiber for transmitting light in both directions between said amplifying section port and said amplifier; and
a second single-mode fiber for transmitting light in both directions between said amplifier and said rotator-reflector.

13. The optical device of claim 7, said rotator-reflector comprising:
a beamsplitter having first, second, and third ports, said beamsplitter being responsive to light selectively applied to said first, second and third ports for passing light of a first polarization state from said first port to said second port, for passing light of a second polarization state from said first port to said third port, for passing light of the first polarization state from said second port to said first port, and for passing light of the second polarization state from said third port to said first port; and
a bidirectional nonreciprocal rotator responsive to light output by said beamsplitter at said second and third ports responsive to light output by said beamsplitter at said second port for producing first light at said third port and responsive to light output by said beamsplitter at said third port for producing second light at said second port.

14. The optical device of claim 1, said transmission means (c) comprising single-mode optical fiber.

15. The optical device of claim 1, said outputting means (d) comprising an isolator.

16. The optical device of claim 1, said reflector of said polarization section comprising a partial reflector responsive to light incident on said reflector for outputting coherent polarized light.

17. The optical device of claim 1, further comprising a coupler having at least first, second and third ports, said first and second ports being for input of light, said second and third ports being for output of light responsive to light received at said first port, said first port being for output of light responsive to light received at said second port, said first port being operatively coupled to said polarization section port, and said second port being operatively coupled to said rotator.

18. The optical device of claim 17, said coupler being a polarization-maintaining coupler, and said optical device further comprising:
first polarization-maintaining means for transmitting light in both directions between said polarization section port and said first port of said coupler; and
second polarization-maintaining means for transmitting light in both directions between said second port of said coupler and said rotator.

19. An optical device comprising:
(a) a polarization section having a port, said polarization section being for receiving light at said port and for outputting light at said port having a state of polarization orthoconjugate to the light received at said port, said polarization section comprising a first beamsplitter having first, second and third ports, said first port being operatively coupled to the polarization section port, said beamsplitter being responsive to light selectively applied to said first, second and third ports for passing light of a first polarization state from said first port to said second port, and for passing light of a second polarization state from said third port to said first port, said first and second polarization states being orthogonal, and a ring for unidirectional transmission of light from said second port to said third port so that light transmitted by said ring to said third port has the second state of polarization;

(b) an amplifying section having a port and a rotator-reflector, said amplifying section being for receiving light at said amplifying section port and for outputting light at said amplifying section port having a state of polarization orthoconjugate to the light received at said amplifying section port and being amplified with respect thereto, said rotator-reflector comprising:
a second beamsplitter having fourth, fifth, and sixth ports, said beamsplitter being responsive to light selectively applied to said fourth, fifth and sixth ports for passing light of a third polarization state from said fourth port to said fifth port, for passing light of a fourth polarization state from said fourth port to said sixth port, for passing light of the third polarization state from said fifth port to said fourth port, and for passing light of the fourth polarization state from said sixth port to said fourth port; and
a bidirectional nonreciprocal rotator responsive to light output by said beamsplitter at said fifth and sixth ports responsive to light output by said beamsplitter at said fifth port for producing first light at said sixth port and responsive to light output by said beamsplitter at said sixth port for producing second light at said fifth port;

(c) means for transmitting light in both directions between said polarization section port and said amplifying section port; and (d) means responsive to light internal to said ring for outputting coherent light having a stable and known state of polarization.

20. A method for producing coherent light comprising the steps:
(a) receiving light at a polarization section port;

(b) outputting light at the polarization section port with a state of polarization orthoconjugate to the light received at said port by:
  rotating the light received at said port by passing the light received at said port in a first direction through a bidirectional nonreciprocal rotator,
  polarizing the light passed through the rotator in the first direction by passing the light passed through the rotator in the first direction in a second direction through a polarizer,
  reflecting the light passed through the polarizer in the second direction back to the polarizer,
  polarizing the light from the reflector by passing the light from the reflector in a third direction through the polarizer, and
  rotating the light passed through the polarizer in the third direction by passing the light passed through the polarizer in the third direction through the rotator in a fourth direction;

(c) transmitting light in both directions between the polarization section port and an amplifying section port;

(d) receiving light at the amplifying section port;

(e) outputting light at the amplifying section port having a state of polarization orthoconjugate to the light received at the amplifying section port and being amplified with respect thereto; and (f) outputting coherent polarized light having a stable and known state of polarization, said outputting step being responsive to light internal to the polarization section.

21. An optical device comprising;
  A) a polarization section comprising:
    a polarization section port;
    a reflector;
    a rotator;
    a polarizer;
    wherein said reflector, said rotator, said polarizer and said polarization section port are disposed effective to receive light into said polarization port and produce output light at said polarization port with a polarization orthoconjugate to the said light received into said polarization port;
  B) an amplifying section comprising:
    an amplifier section port;
    a gain medium;
    a rotator-reflector;
    wherein said rotator-reflector, said gain medium and said polarization section port are disposed effective to receive light at said amplifier section port and produce output light at said amplifier section port with a polarization orthoconjugate to said light received at said amplifier section port and amplified with respect to said light received at said amplifier section port;
  C) a means for coupling said amplifying section and said polarization section responsive to said light output at said amplifier section port and said light output at said polarization section port;
  wherein said device produces coherent light of a known and stable polarization independent of the polarization of the source light.

22. The device of claim 21 wherein said polarizer, said rotator, and said reflector are coupled via polarization maintaining means.

23. The device of claim 21 wherein said rotator is a nonreciprocal rotator.

24. The device of claim 21 wherein said rotator is a Faraday rotator.

25. The device of claim 21 wherein said polarizer is a bidirectional polarizer.

26. The device of claim 21 wherein said rotator-reflector in said amplifying section comprises a Faraday rotator.

27. The device of claim 21 wherein said Faraday rotator is coupled via polarization maintaining means.

28. The device of claim 21 wherein said rotator-reflector in said amplifying section comprises;
  a beamsplitter having at least 3 beamsplitter ports;
  a means for coupling at least 2 of said beamsplitter ports;
  wherein at least two of said beamsplitter ports are coupled in series by coupling means with said rotator disposed therebetween coupled effective to produce light at the other of said port with a polarization orthoconjugate to said light received at the other of said beamsplitter port.

29. The device of claim 28 wherein said means for coupling at least 2 of said beamsplitter ports is polarization maintaining.

30. The device of claim 28 wherein said beamsplitter is a polarization beamsplitter.

31. The device of claim 28 wherein said rotator is a bidirectional nonreciprocal rotator.

32. The device of claim 28 wherein said rotator is a Faraday rotator.

33. The device of claim 21 wherein said amplifying section further comprises at least one wavelength tuning element coupled between said rotator-reflector and said gain medium.

34. The device of claim 21 wherein said reflector is a fiber loop mirror.

35. The device of claim 34 wherein said reflector is a variable-reflecting fiber loop mirror.

36. The device of claim 35 wherein said variable-reflecting fiber loop mirror is polarization-maintaining.

37. The device of claim 34 wherein said fiber loop mirror is a polarization-maintaining loop mirror.

38. The device of claim 21 wherein said polarization section further comprises an output coupler coupled to said polarization section port, adapted to transmit light.

39. The device of claim 38 wherein said output coupler is a polarization-maintaining output coupler.

* * * * *